United States Patent
Tang et al.

(10) Patent No.: US 9,824,701 B2
(45) Date of Patent: Nov. 21, 2017

(54) MICROWAVE ASSISTED MAGNETIC RECORDING HEAD WITH SPIN TORQUE OSCILLATOR CORNER ANGLE RELATIONSHIP, HEAD GIMBAL ASSEMBLY, AND MAGNETIC RECORDING DEVICE

(71) Applicant: TDK Corporation, Tokyo (JP)

(72) Inventors: Zhenyao Tang, Tokyo (JP); Tetsuya Roppongi, Tokyo (JP); Yoshikazu Soeno, Tokyo (JP); Hironobu Matsuzawa, Tokyo (JP); Hirokazu Takahashi, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 15/138,486

(22) Filed: Apr. 26, 2016

(65) Prior Publication Data

US 2017/0309299 A1   Oct. 26, 2017

(51) Int. Cl.
*G11B 5/31* (2006.01)
*G11B 5/235* (2006.01)
*G11B 5/127* (2006.01)
*G11B 5/00* (2006.01)

(52) U.S. Cl.
CPC ............ *G11B 5/1278* (2013.01); *G11B 5/235* (2013.01); *G11B 5/314* (2013.01); *G11B 5/3146* (2013.01); *G11B 2005/0024* (2013.01)

(58) Field of Classification Search
None
See application file for complete search history.

(56) References Cited

U.S. PATENT DOCUMENTS

| | | | |
|---|---|---|---|
| 8,081,397 B2 | 12/2011 | Funayama et al. | |
| 8,238,058 B2 | 8/2012 | Shimizu et al. | |
| 8,446,691 B2* | 5/2013 | Takagishi et al. | ... G11B 5/3146 360/125.3 |
| 8,477,453 B2 | 7/2013 | Takano et al. | |
| 8,614,861 B1 | 12/2013 | Tomoda et al. | |
| 8,675,308 B2 | 3/2014 | Yamada et al. | |
| 8,773,818 B2 | 7/2014 | Taguchi et al. | |
| 9,001,465 B1* | 4/2015 | Shimizu et al. | ....... G11B 5/235 360/125.3 |
| 9,129,621 B1* | 9/2015 | Kimura et al. | ...... G11B 5/3146 |
| 9,202,484 B1* | 12/2015 | Watanabe et al. | ..... G11B 5/314 |
| 9,679,587 B2* | 6/2017 | Taguchi et al. | ........ G11B 5/235 |
| 2016/0314809 A1* | 10/2016 | Taguchi et al. | ........ G11B 5/314 |
| 2017/0092304 A1* | 3/2017 | Koizumi et al. | ..... G11B 5/1278 |

* cited by examiner

*Primary Examiner* — Craig A. Renner
(74) *Attorney, Agent, or Firm* — Posz Law Group, PLC (57) ABSTRACT

A microwave assisted magnetic head includes a main magnetic pole; a trailing shield; and a spin torque oscillator provided between the main magnetic pole and the trailing shield. The spin torque oscillator has a first end surface configuring a part of an air bearing surface, a second end surface facing the main magnetic pole, and a third end surface facing the first end surface, the first angle θ1 made by the first end surface and the second end surface is smaller than the second angle θ2 formed by the second end surface and the third end surface, and the second angle θ2 is 80 to 100 degrees.

12 Claims, 10 Drawing Sheets

MICROWAVE ASSISTED MAGNETIC RECORDING HEAD WITH SPIN TORQUE OSCILLATOR CORNER ANGLE RELATIONSHIP, HEAD GIMBAL ASSEMBLY, AND MAGNETIC RECORDING DEVICE

FIELD OF THE INVENTION

The present invention relates to a microwave assisted magnetic head, a head gimbal assembly, and a magnetic recording device.

BACKGROUND OF THE INVENTION

In the field of magnetic recording using a head and a medium, further improvement in performance of the magnetic recording medium and the magnetic head is demanded as the magnetic disc device has higher recording densities.

A magnetic recording medium is a discontinuous medium consisting of a set of magnetic grains, and each magnetic grain has a single-domain structure. In the magnetic recording medium, one recording bit consists of a plurality of magnetic grains. Therefore, in order to increase the recording density, the magnetic grains must be smaller, and the borders between adjacent recording bits must be less uneven. However, a problem is that as the magnetic particles become smaller, the magnetic grains are less thermally stable in association with their reduced volume.

A presumable measure to solve the above problem is to increase the magnetic anisotropy energy Ku of the magnetic grains. However, the increase in the Ku leads to an increase in the anisotropic magnetic field (magnetic coercive force) of the magnetic recording medium. On the other hand, the upper limit of the recording magnetic field intensity of a magnetic head is largely determined by the saturation magnetic flux density of the soft magnetic material configuring the magnetic core within the head. Therefore, if the anisotropic magnetic field of the magnetic recording medium exceeds an acceptable value determined based on the upper limit of the recording magnetic field intensity, recording on the magnetic recording medium fails.

Currently, a method of solving the above problem of thermal stability has been proposed in which, energy assisted recording in which assistive energy is provided to a medium during recording so as to lower the effective recording magnetic field intensity for a magnetic recording medium formed by a high Ku magnetic material. The recording system using a microwave magnetic field as the assistive energy source is called microwave assisted magnetic recording (MAMR) and is being proactively developed for practical use.

In the microwave assisted magnetic recording, a microwave magnetic field of a frequency corresponding to the effective magnetic field (Heff) for magnetization of the recording layer of a magnetic recording medium is applied in the medium in-plane direction, whereby magnetization precession is excited in the recording layer, and the recording capability of the magnetic head is assisted.

Figure 11:
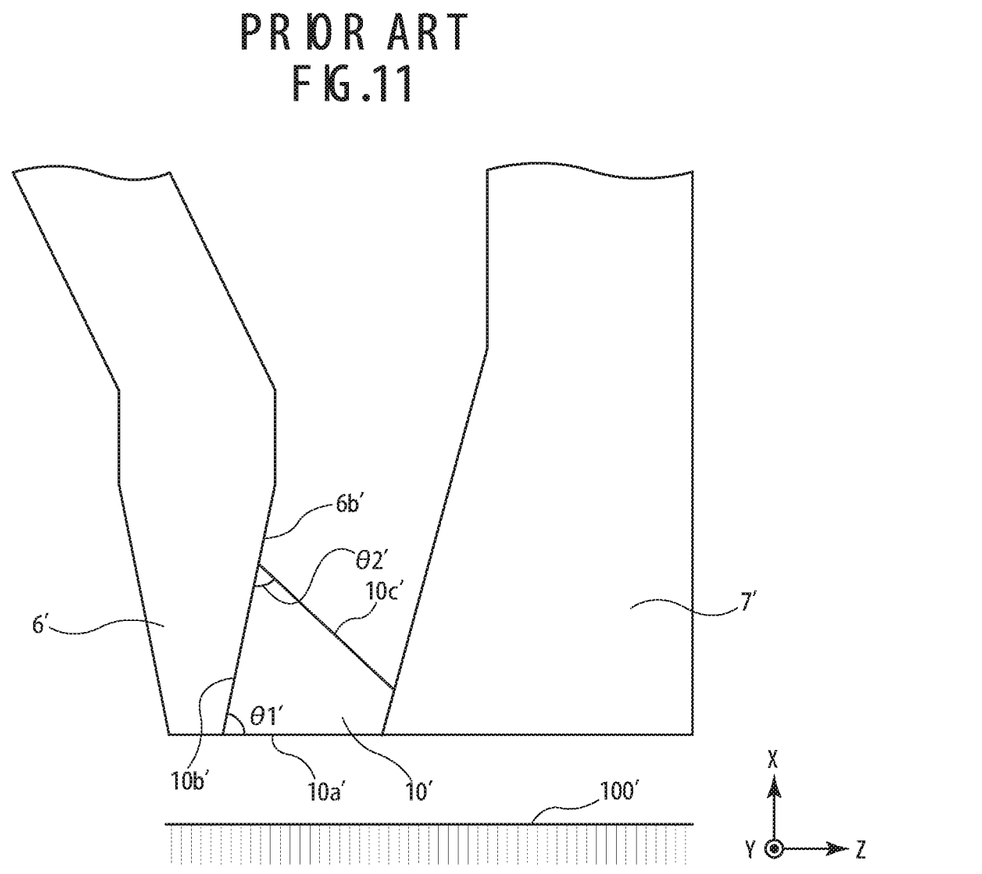
FIG. 11 is a partial enlarged cross-sectional view showing the schematic configuration of the recording head of a prior art microwave assisted magnetic head near the spin torque oscillator.

As an exemplary magnetic head using the microwave assisted magnetic recording system, a magnetic head shown in FIG. 11, is proposed that includes a main magnetic pole $6'$ generating a recording magnetic field to apply to a magnetic recording medium $100'$, a trailing shield $7'$, and a spin torque oscillator (STO) $10'$ provided between them (in the write gap) and having a multilayer structure of magnetic films (U.S. Pat. No. 9,001,465). With a current applied along the lamination direction of the spin torque oscillator $10'$, the spin torque oscillator $10'$ generates a microwave magnetic field through its own oscillation. With the microwave magnetic field and recording magnetic field applied to the magnetic recording medium $100'$ in a superimposed manner, magnetization precession is induced in the recording layer, and the perpendicular magnetization of the recording layer is inverted. The spin torque oscillator $10'$ has a first end face $10a'$ forming a part of the air bearing surface, a second end face $10b'$ adjacent to a trailing side end face $6b'$ of the main magnetic pole $6'$, and a third end face $10c'$ facing the first end face $10a'$. The angle $\theta1'$ made by the first end face $10a'$ and the second end face $10b'$ and the angle $\theta2'$ made by the second end face $10b,'$ and the third end face $10c,'$ satisfy the relationship expression $\theta1' \geq \theta2'$. In such a magnetic head, in order to yield a sufficient assist effect for the spin torque oscillator $10'$, the main magnetic pole $6'$ and the spin torque oscillator $10'$ must be close to each other. However, as the main magnetic pole $6'$ and the spin torque oscillator $10'$ are close to each other, a magnetic field is applied to the spin torque oscillator $10'$ from the main magnetic pole $6'$ during writing, whereby the spin torque oscillator $10'$ oscillates unevenly, and the oscillation frequency widely fluctuates.

When the spin torque oscillator $10'$ oscillates unevenly and the oscillation frequency widely fluctuates (the spin torque oscillator $10'$ has a broad oscillation spectrum and a low peak value), the average value of magnetization components in the in-plane direction (the average in-plane magnetization value) of the magnetic field generation layer generating a microwave magnetic field in the spin torque oscillator $10'$ is lowered. As a result, the magnetic field intensity of the microwave magnetic field generated from the spin torque oscillator $10'$ becomes lower, and thus sufficient assist effect cannot be obtained.

SUMMARY OF THE INVENTION

The objective of the present invention is to provide a microwave assisted magnetic head, a head gimbal assembly, and a magnetic recording device having a spin torque oscillator capable of substantially evenly oscillating at a stable oscillation frequency, whereby a sufficient assist effect is obtained.

In order to achieve the above objective, the present invention provides a microwave assisted magnetic head including a main magnetic pole generating a recording magnetic field applied to a magnetic recording medium from an end surface forming a part of the air bearing surface facing the magnetic recording medium, a trailing shield forming a magnetic guide with the main magnetic pole and a spin torque oscillator provided between the main magnetic pole and trailing shield and generating a microwave magnetic field applied to the magnetic recording medium in a superimposed manner on the recording magnetic field, wherein the spin torque oscillator has a first end surface forming a part of the air bearing surface, a second end surface facing the main magnetic pole and a third end surface facing the first end face. A first angle $\theta1$ formed by the first end surface and the second end surface is smaller than a second angle $\theta2$ formed by the second end surface and the third end surface, and the second angle $\theta2$ is 80 to 100 degrees.

In the above invention, the second angle $\theta2$ is preferably 80 to 90 degrees, and the first angle $\theta1$ is preferably greater than or equal to 50 degrees and less than 80 degrees.

Moreover, the present invention provides a head gimbal assembly including the microwave assisted magnetic head according to the above invention, and a suspension supporting the microwave assisted magnetic head.

Furthermore, the present invention provides a magnetic recording device including a magnetic recording medium, the microwave assisted magnetic head according to the above invention, and a positioning device supporting and positioning the microwave assisted magnetic head with respect to the magnetic recording medium.

The present invention can provide a microwave assisted magnetic head, a head gimbal assembly, and a magnetic recording device having a spin torque oscillator capable of substantially evenly oscillating at a stable oscillation frequency, whereby a sufficient assist effect is obtained.

DERAILED DESCRIPTION OF THE INVENTION

Prior to explanation of an embodiment of the present invention, the terms used in this specification are defined. In a multilayer structure or element structure formed on the element forming surface of a slider substrate of the microwave assisted magnetic head according to this embodiment, viewed from a reference layer or element, the substrate side is referred to as "lower" and the opposite side is referred to as "upper." Moreover, viewed from a reference layer or element, the air bearing surface side is referred to as "front" and the opposite side is referred to as "back" or "rear." Furthermore, in the microwave assisted magnetic head according to this embodiment, the "X-, Y-, and Z-axis directions" are defined in some figures as needed. Here, the Z-axis direction is the above-mentioned "vertical direction"; the +Z side corresponds to the trailing side and the −Z side corresponds to the leading side. Moreover, the Y-axis direction is the track width direction and the X-axis direction is the height direction.

[Magnetic Recording Device]

Figure 1:
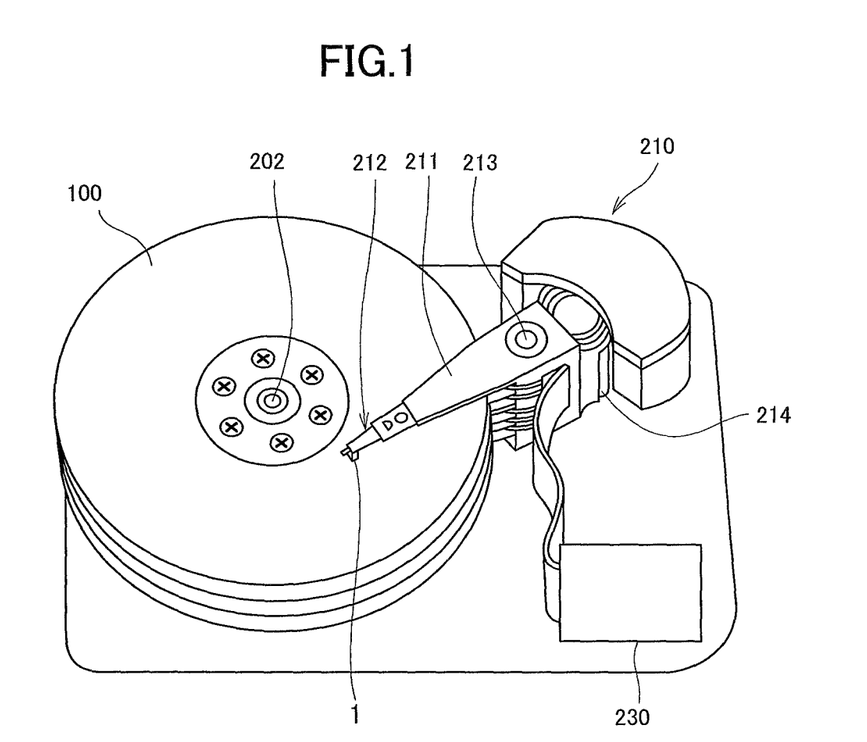
FIG. 1 is a perspective view schematically showing the magnetic recording device in an embodiment of the present invention.
Figure 2:
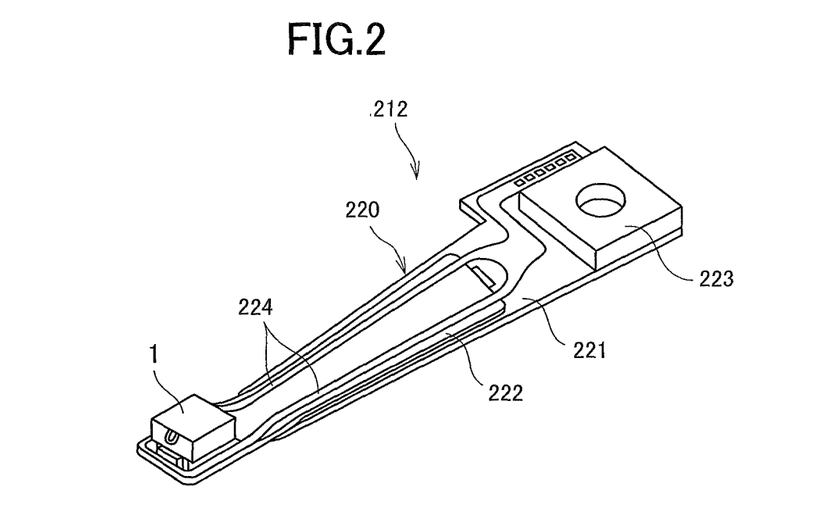
FIG. 2 is a perspective view schematically showing the head gimbal assembly (HGA) in the embodiment of the present invention.
Figure 3:
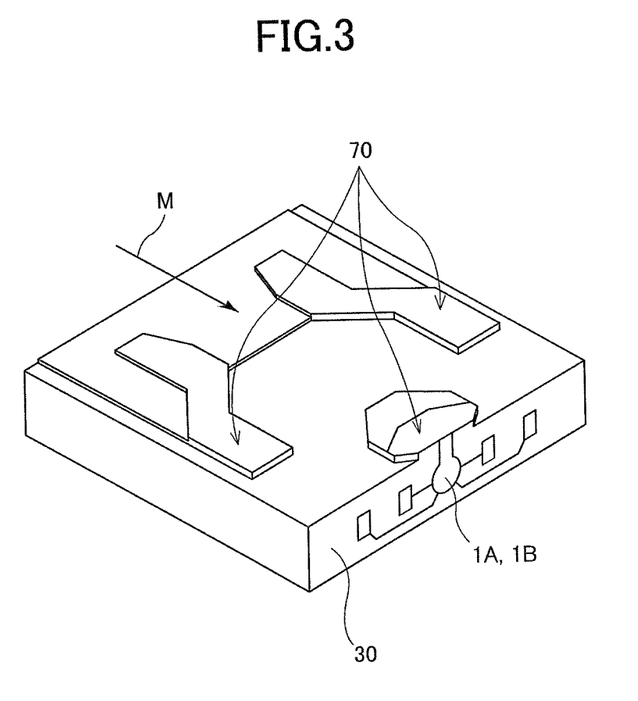
FIG. 3 is a perspective view schematically showing the entire structure of the microwave assisted magnetic head in the embodiment of the present invention.

FIG. 1 is a perspective view schematically showing the magnetic recording device in which the microwave assisted magnetic head according the present embodiment is mounted. FIG. 2 is a perspective view schematically showing the head gimbal assembly (HGA) including the microwave assisted magnetic head according the present embodiment. FIG. 3 is a perspective view schematically showing the entire configuration of the microwave assisted magnetic head according to the present embodiment.

As shown in FIG. 1, the magnetic recording device in the present embodiment includes a plurality of magnetic discs 100 rotating around a rotation shaft of a spindle motor 202, an assembly carriage device 210 provided with a plurality of drive arms 211, head gimbal assemblies (HGAs) 212 attached to the front end portion of each drive arm 211 and each having a microwave assisted magnetic head 1, and a control circuit 230 controlling writing, reading and the like of the microwave assisted magnetic heads 1.

In the present embodiment, the magnetic discs 100 as magnetic recording media are for perpendicular magnetic recording and have a structure in which, for example, a soft magnetic under layer, an intermediate layer, a magnetic recording layer (perpendicular magnetization layer) and the like are sequentially laminated on a disc substrate.

The assembly carriage device 210 is a device for positioning the microwave assisted magnetic heads 1 on the tracks of the magnetic discs 100 on which recording bits are arranged. In the assembly carriage device 210, the drive arms 211 are stacked in the direction along a pivot bearing shaft 213 and angularly swingable about the pivot bearing shaft 213 by a voice coil motor (VCM) 214.

Here, the structure of the magnetic recording device in the present embodiment is not restricted to the above-described structure and may have a single magnetic disc 100, drive arm 211, HGA 212, and microwave assisted magnetic head 1.

In the head gimbal assembly 212 shown in FIG. 2, a suspension 220 has a load beam 221, a flexure 222 fixed to the load beam 221 and having elasticity, and a base plate 223 provided at the base portion of the load beam 221. Moreover, a wiring member 224 including a lead conductor and connection pads electrically connected to both ends of the lead conductor is provided on the flexure 222. A magnetic head slider 30 (see FIG. 3) including the microwave assisted magnetic head 1 in the present embodiment is fixed to the flexure 222 at the front end portion of the suspension 220 so as to face the surface of each magnetic disc 100 with a predetermined space (a flying height).

Furthermore, one end of the wiring member 224 is electrically connected to a terminal electrode of the microwave assisted magnetic head 1 in the present embodiment. The structure of the suspension 220 in the present embodiment is not restricted to the above described structure, either.

As shown in FIG. 3, the magnetic head slider 30 has an ABS (air bearing surface) 70 directly involved in the flying characteristic and includes the microwave assisted magnetic head 1 on a lateral end in the moving direction M of the magnetic disc 100 (the same direction as the air flow) (the rear lateral end in the moving direction M of the magnetic disc 100). The microwave assisted magnetic head 1 includes a recording head 1B and a reproducing head 1A.

[Microwave Assisted Magnetic Head]

Figure 4:
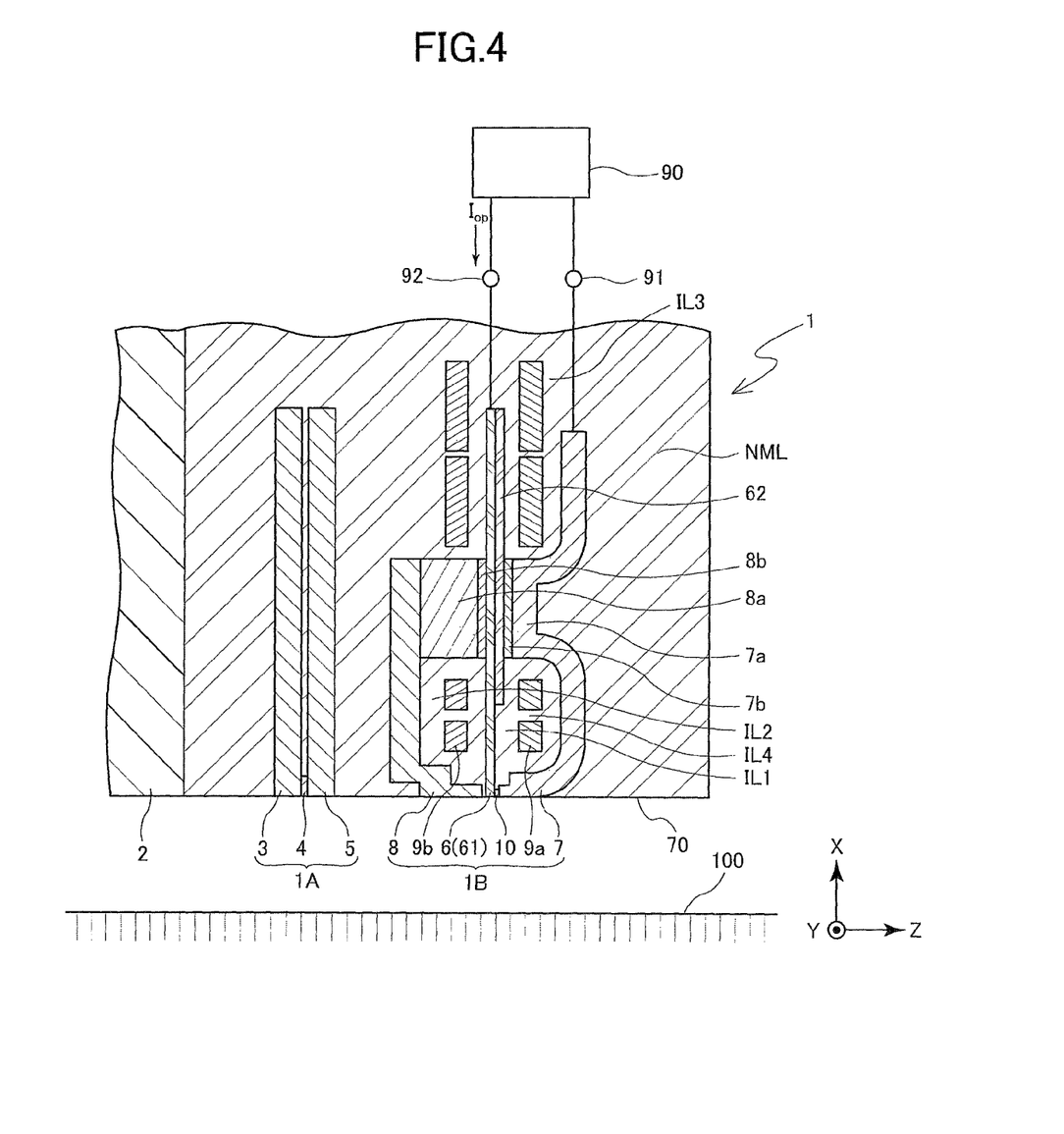
FIG. 4 is a cross-sectional view (XZ plane) schematically showing the configuration of the core part of the microwave assisted magnetic head in the embodiment of the present invention.

The microwave assisted magnetic head according to the present embodiment is described hereafter with reference to the drawings. FIG. 4 is a cross-sectional view (XZ cross-sectional view) along the direction intersecting the ABS which is the air bearing surface of the microwave assisted magnetic head according to the present embodiment.

As shown in FIG. 4, the microwave assisted magnetic head 1 according to the present embodiment has a slider substrate 2 and the reproducing head 1A and the recording head 1B laminated/formed on the element forming surface of the slider substrate 2. Moreover, the microwave assisted magnetic head 1 has the ABS 70 that is the air bearing surface facing the magnetic disc 100.

The reproducing head 1A has an MR element 4 placed near the ABS 70 for detecting a signal magnetic field from the magnetic disc 100, and a lower shield layer 3 and an upper shield layer 5 formed on the element forming surface of the slider substrate 2 and consisting of a magnetic material.

The lower shield layer 3 and the upper shield layer 5 are provided primarily for preventing the MR element 4 from receiving external magnetic field causing noise. The lower shield layer 3 and the upper shield layer 5 are magnetic layers consisting of a magnetic material and formed by, for example, frame plating or sputtering. The lower shield layer 3 and the upper shield layer 5 each are configured by a soft magnetic material such as NiFe (permalloy), FeSiAl (sendust), CoFeNi, CoFe, FeN, FeZrN, or CoZrTaCr, or a multilayer film of these materials. The lower shield layer 3 and the upper shield layer 5 have a thickness of, for example, approximately 0.1 to 3 μm, respectively.

The MR element 4 is a magnetic sensor sensing a signal magnetic field using the MR effect and may be, for example, any of the following: a current in plane giant magneto-resistive (CIP-GMR) multilayer body using the in-plane conduction type giant magneto-resistive effect, a current perpendicular to plane giant magneto-resistive (CPP-GMR) multilayer body using the perpendicular conduction type giant magneto-resistive effect, and a tunneling magneto-resistive (TMR) multilayer body using the tunneling magneto-resistive effect.

The MR element 4 using the above MR effect can sense a signal magnetic field from the magnetic disc 100 with high sensitivity. When the MR element 4 is a CPP-GMR multilayer body or TMR multilayer body, the lower shield layer 3 and the upper shield layer 5 can also function as an electrodes. On the other hand, when the MR element 4 is a CIP-GMR multilayer body, insulating layers are provided between the MR element 4 and the lower shield layer 3 and between the MR element 4 and the upper shield layer 5, and an MR lead layer electrically connected to the MR element 4 is further provided.

The recording head 1B is for perpendicular magnetic recording and has a main magnetic pole layer 6, a trailing shield 7, a leading shield 8, a spin torque oscillator 10 situated in a gap (write gap) between the main magnetic pole layer 6 and the trailing shield 7, a first coil 9a, and a second coil 9b.

The main magnetic pole layer 6 configures a magnetic guide for guiding magnetic flux generated by application of a writing current to the first coil 9a and the second coil 9b to the magnetic recording layer (perpendicular magnetization layer) of the writable magnetic disc while converging the magnetic flux.

The main magnetic pole layer 6 extends backward in the height direction from the ABS 70 and includes a main magnetic pole part 61 and an auxiliary magnetic pole part 62. The main magnetic pole part 61 and the auxiliary magnetic pole part 62 can be reversed in vertical position (in the Z direction) depending on the design specification.

Figure 6:
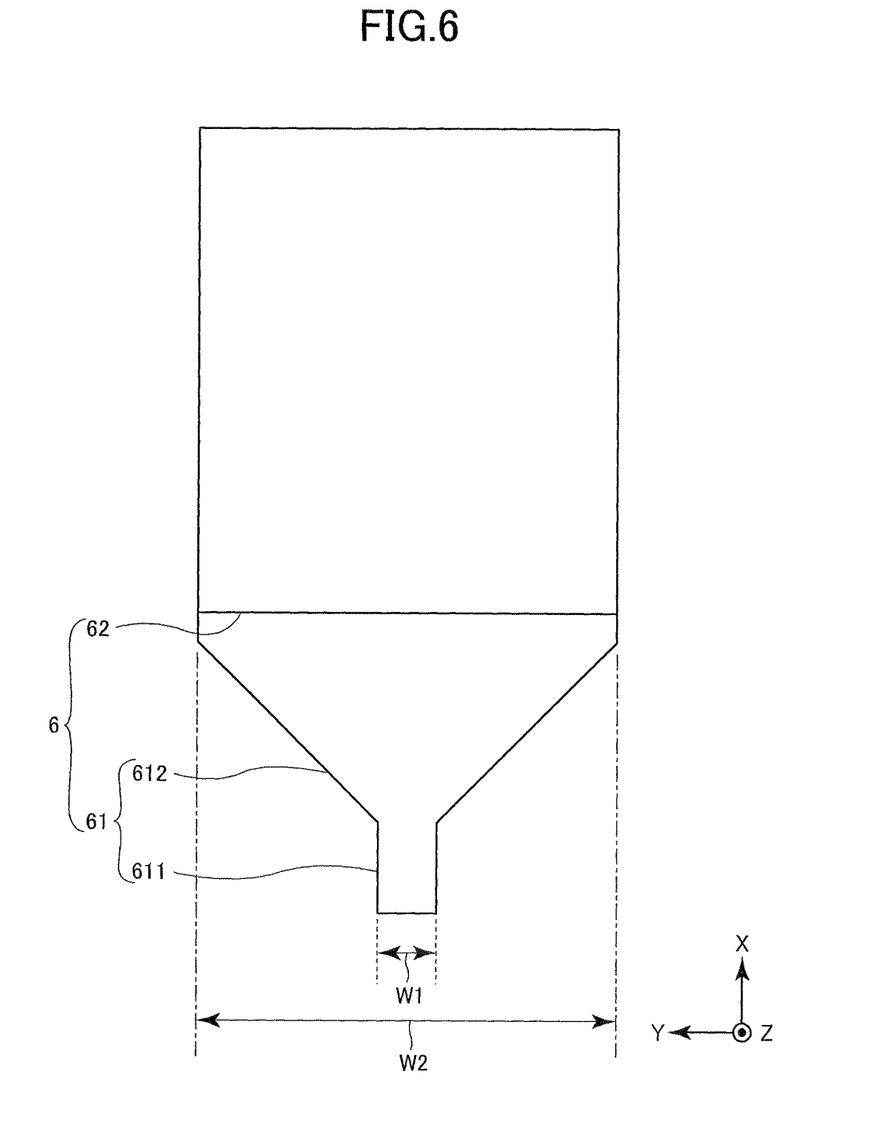
FIG. 6 is a plan view schematically showing the main magnetic pole layer in the recording head of the microwave assisted magnetic head in the embodiment of the present invention.

The auxiliary magnetic pole part 62 extends in the height direction from a position receded from the ABS 70. The auxiliary magnetic pole part 62 is placed, for example, on the leading side with respect to the main magnetic pole part 61 and, as shown in FIG. 6, has a rectangular planar shape (width W2). The auxiliary magnetic pole part 62 can also be placed on the trailing side of the main magnetic pole part 61 as mentioned above.

The main magnetic pole part 61 extends backward in the height direction from the ABS 70. The main magnetic pole part 61 includes, for example, as shown in FIG. 6, a first magnetic pole part 611 that is narrow and that extends backward in the height direction from the ABS 70 and a second magnetic pole part 62 that is wide and continues backward from the first magnetic pole part 611.

The first magnetic pole part 611 is a part to substantially release a magnetic flux and has a constant width W1 defining the recording track width. The second magnetic pole part 612 is a part to supply a magnetic flux to the first magnetic pole part 611 and has a width W2 larger than the width W1 of the first magnetic pole part 611. The width W2 of the second magnetic pole part 612 is gradually decreased in the front part in the height direction toward the first magnetic pole part 611. The first magnetic pole part 611 having a small width W1 makes it possible to generate a fine writing magnetic field and thus makes it possible to set the track width to a small value corresponding to a higher recording density.

Figure 7:
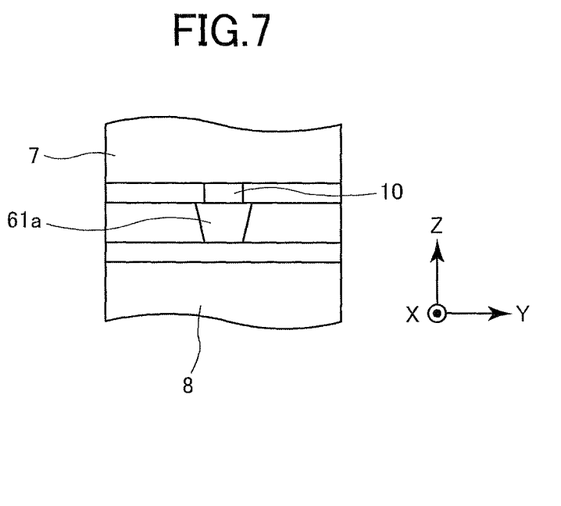
FIG. 7 is a plan view showing the schematic configuration of the recording head of the microwave assisted magnetic head in the embodiment of the present invention viewed from the ABS side.

The main magnetic pole part 61 has a so-called inverted trapezoidal end surface 61a on the ABS 70, which is wider at the upper side (+Z side) than at the lower side (−Z side), and has a width that is decreased in the downward direction (−Z direction) (see FIG. 7).

The main magnetic pole layer 6 (main magnetic pole part 61 and auxiliary magnetic pole part 62) is configured by a soft magnetic material having a high saturation magnetic flux density and can be configured by, for example, a soft magnetic material such as an iron alloy material of which the main constituent is Fe (FeNi, FeCo, FeCoNi, FeN, or FeZrN). The main magnetic pole part 61 and the auxiliary magnetic pole part 62 may be formed as separate bodies and configured by different soft magnetic materials. For example, the main magnetic pole part 61 may be configured by a soft magnetic material having a higher saturation magnetic flux density than the auxiliary magnetic pole part 62.

Figure 5A:
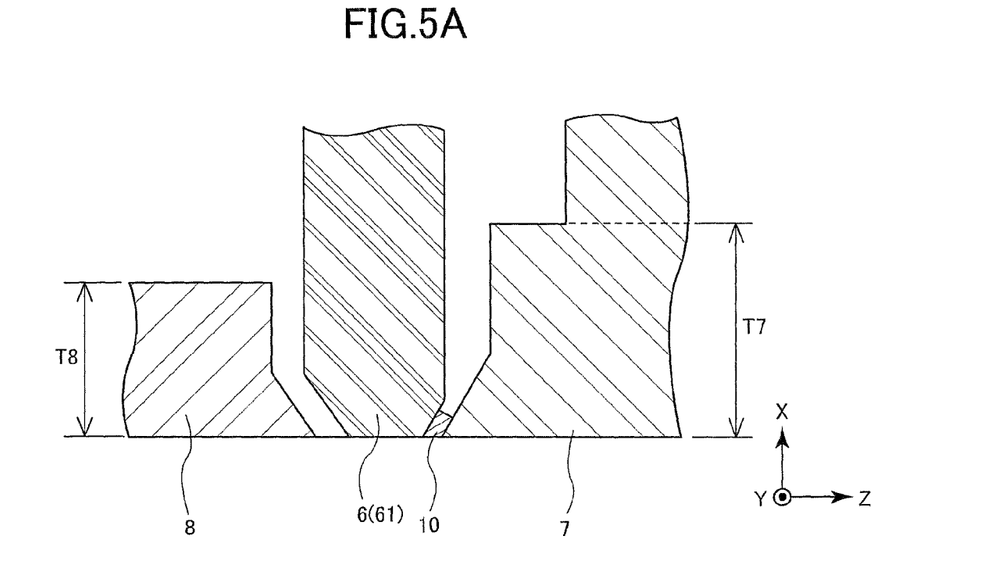
FIG. 5A is a partial enlarged cross-sectional view showing the schematic configuration of the recording head of the microwave assisted magnetic head in the embodiment of the present invention.

As shown in FIG. 5A, the trailing side (+Z side) end surface and the leading side (−Z side) end surface of the main magnetic pole part 61 near the ABS 70 are tapered so that the main magnetic pole part 61 has a thickness (thickness in the Z direction) that is gradually reduced toward the ABS 70. As a result, the recording magnetic flux emerging from the main magnetic pole part 61 (first magnetic pole part 611) can be converged more on the ABS 70.

The spin torque oscillator 10 generating a microwave magnetic field that is superimposed on the recording magnetic field from the main magnetic pole layer 6 (main magnetic pole part 61) during writing is provided in the gap (write gap) between the main magnetic pole part 61 and trailing shield 7.

Figure 8:
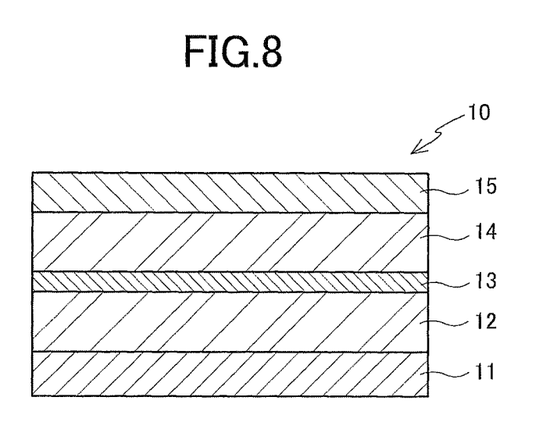
FIG. 8 is a cross-sectional view showing the schematic configuration of the spin torque oscillator in the embodiment of the present invention.

As shown in FIG. 8, the spin torque oscillator 10 is a multilayer element in which an under layer 11, a spin injection layer 12, a non-magnetic spacer layer 13, a magnetic field generation layer 14, and a cap layer 15 consisting of Ru or the like and having a thickness of approximately 0.4 to 20 nm are laminated in this order. With a direct current flowing from the under layer 11 to the cap layer 15, the magnetization of the magnetic field generation layer 14 is subject to precession, whereby the spin torque oscillator 10 can generate a high frequency magnetic field (microwave magnetic field) from the magnetic field generation layer 14.

The under layer 11 is configured by at least one simple metal or an alloy of two or more metals selected from a group of, for example, tantalum (Ta), vanadium (V), titanium (Ti), chromium (Cr), manganese (Mn), iron (Fe), cobalt (Co), nickel (Ni), and copper (Cu). The thickness of the under layer 11 is preferably 0.4 to 5 nm and more preferably 0.8 to 3 nm. Even with the thickness of the under layer 11 falling within the above ranges, a high level of perpendicular magnetic anisotropy can be induced in the spin injection layer 12.

The spin injection layer 12 is a ferromagnetic layer having the magnetic anisotropy perpendicular to the film surface (perpendicular magnetic anisotropy) and configured by a multilayer film of magnetic materials such as [CoFe/Ni]n, [Co/Pt]n, or [Co/Pd]n or a multilayer film of magnetic and non-magnetic materials. Here, "n" is the number of repeats of the multilayer structure in the square brackets, which is preferably 2 to 40 and more preferably 2 to 20. With a current flowing in the lamination direction of the spin torque oscillator 10, the spin injection layer 12 can polarize the spins of electrons and inject the spin-polarized electrons into the magnetic field generation layer 14.

The non-magnetic spacer layer 13 may be configured by a highly spin-permeable non-magnetic metal such as Cu, Ag, Au, Cr, and Al, or may be a tunnel barrier layer such as a MgO layer or $Al_2O_3$ layer. The thickness of the non-magnetic spacer layer 13 is, for example, approximately 0.5 to 5 nm and can preferably be approximately 1.5 to 3 nm. With the thickness of the non-magnetic spacer layer 13 falling within the above ranges, the state of exchange coupling between the spin injection layer 12 and the magnetic field generation layer 14 can be optimized.

The magnetic field generation layer 14 is a ferromagnetic layer configured by a material of which the magnetization direction is nearly parallel to the film surface in an initial state (a state in which no current flows and no magnetic field is applied). The material of the magnetic field generation layer 14 includes, for example, soft magnetic materials such as [FeCo/Ni]m, FeCo, FeCoAl, FeCoSi, FeCoB, and FeNi, and Coir and [Fe/Co]m having the negative perpendicular magnetic anisotropy. Here, "m" is the number of repeats of the multilayer structure in the square brackets, which is preferably 1 to 20 and more preferably 3 to 10. The thickness of the magnetic field generation layer 14 is approximately 2 to 20 nm and preferably approximately 5 to 15 nm.

Figure 5B:
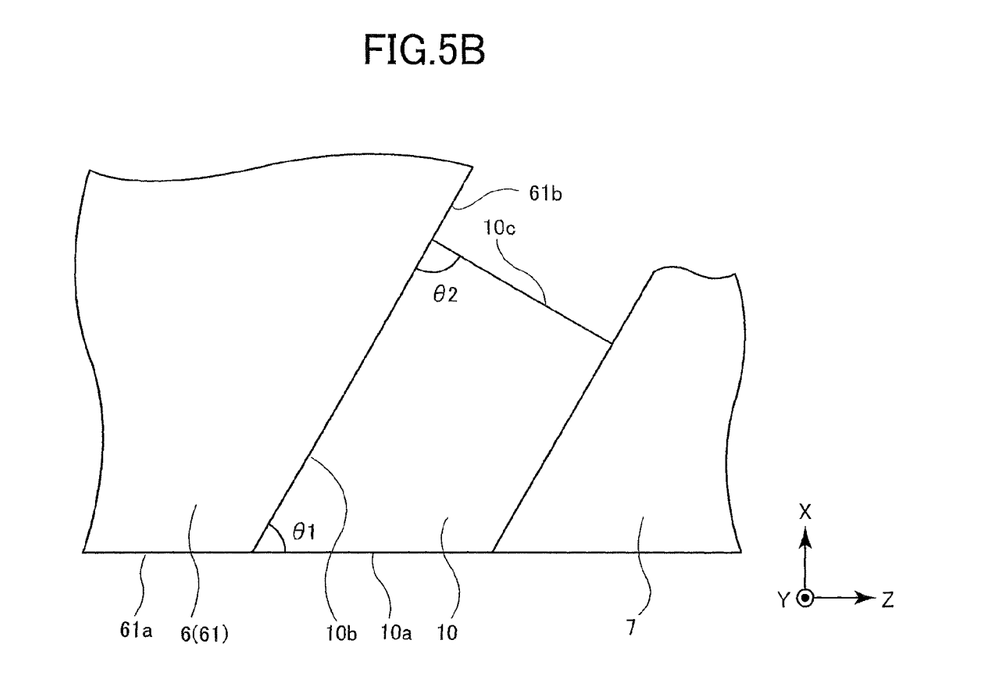
FIG. 5B is a partial enlarged cross-sectional view showing the schematic configuration of the recording head near the spin torque oscillator.

As shown in FIG. 5B, the spin torque oscillator 10 in the present embodiment has a first end surface 10a configuring a part of the ABS 70, a second end surface 10b facing the trailing side end surface (inclined end surface) 61b of the main magnetic pole part 61, and a third end surface 10c situated in the back in the height direction and facing the first end surface 10a.

In the spin torque oscillator 10, the first angle θ1 formed by the first end surface 10a and the second end surface 10b is smaller than the second angle θ2 formed by the second end surface 10b and the third end surface 10c. Specifically, the first angle θ1 is smaller than 80 degrees and preferably greater than or equal to 50 degrees and less than 80 degrees. On the other hand, the second angle θ2 is 80 to 100 degrees and preferably 80 to 90 degrees. With the first angle θ1 and the second angle θ2 having the above relationship, the spin torque oscillator 10 can substantially evenly oscillate at a stable oscillation frequency without the influence of the magnetic field applied to the spin torque oscillator 10 (magnetic field generation layer 14) during writing, and thereby can generate a microwave magnetic field of a magnetic field intensity sufficient for obtaining the assist effect.

The trailing shield 7 and the leading shield 8 have the function of receiving and spreading in the recording magnetic flux emerging from the main magnetic pole part 61. The trailing shield 7 reaches the ABS 70 and functions as a magnetic guide for the magnetic flux returning from the soft magnetic under layer provided below the recording layer (perpendicular magnetization layer) of the recording disc 100. The thicknesses (the minimum thicknesses in the height direction of the parts facing the ABS 70) T7 and T8 (see FIG. 5A) of the trailing shield 7 and the leading shield 8 are, for example, approximately 0.05 to 1 μm. The trailing shield 7 and the leading shield 8 can be configured by, for example, NiFe (permalloy) or the same iron alloy material as the main magnetic pole layer 6, having a high saturation magnetic flux density.

In the back away from the ABS 70 in the height direction, a first back gap layer 7b is provided between the main magnetic pole layer 6 and trailing shield 7 and consists of an insulator electrically insulating them, and a second back gap layer 8b is provided between the main magnetic pole layer 6 and the leading shield 8 and consists of an insulator electrically insulating them.

The first coil 9a and the second coil 9b generate a magnetic flux for magnetic recording on the magnetic disc 100 and are configured by, for example, a highly electrically conductive material such as copper (Cu). The first coil 9a and the second coil 9b have a winding structure (spiral structure) in which they are wound around coupling parts 7a and 8a, the first back gap layer 7b and the second back gap layer 8b, respectively. The first coil 9a and the second coil 9b are configured to have a two-turn loop shape continuing from one to the other and have a front turn part nearly above insulating layers IL1 and IL2, respectively.

A non-magnetic layer NML is provided behind the pre-turn parts of the first coil 9a and the second coil 9b in the height direction via an insulating layer IL3. The non-magnetic layer NML continues on the trailing shield 7 and reaches the ABS 70. The non-magnetic layer NML primarily functions as a protective layer.

In the present embodiment, the first coil 9a and the second coil 9b have two turns. However, the number of turns is not restricted to this mode and can be set appropriately.

The first coil 9a and the second coil 9b have a plurality of turns, and it is desirable that wound coil spaces are filled with an insulting layer IL4 of a dry film. The dry film insulating layer IL4 is preferably configured by a material such as alumina formed into a film by so-called CVD (chemical vapor deposition). In order to reliably form the dry film insulating layer IL4 into coil spaces, the coil shape is particularly important and it is particularly desirable that the coils do not have an inverse tapered shape in the depth direction.

In the present embodiment, the main magnetic pole layer 6 (main magnetic pole part 61) and the trailing shield 7 are connected to a drive current circuit (power supply circuit) 90 for applying a drive current (direct current) $I_{OP}$ to the spin torque oscillator 10 via terminals 91 and 92, respectively. The drive current (direct current) $I_{OP}$ supplied from the drive current circuit 90 flows through the main magnetic pole layer 6 (main magnetic pole part 61), the spin torque oscillator 10, and the trailing shield 7 in this order.

With the drive current $I_{OP}$ flowing, the magnetization of the spin injection layer 12 causes electrons to be spin-polarized. When the spin polarization of the spin injection layer 12 is positive, the spins of electrons polarized in the opposite direction to the majority spin of the spin injection layer 12 are reflected on the spin injection layer and injected into the magnetic field generation layer 14. The reflected spin electrons act on the magnetization of the magnetic field generation layer 14 and induce magnetization precession of the magnetic field generation layer 14, and the magnetic field generation layer 14 generates a microwave magnetic field. With this microwave magnetic field being superimposed on the recording magnetic field from the main magnetic pole layer 6, signals can be recorded on the magnetic disc 100 having a high magnetic anisotropy energy Ku.

The drive current $I_{OP}$ may flow through the trailing shield 7, the spin torque oscillator 10, and the main magnetic pole layer 6 (main magnetic pole part 61) in this order depending on the layer configuration of the spin torque oscillator 10 and the microwave magnetic field generation mechanism and the like.

In the spin torque oscillator 10 having the above configuration, the first angle θ1 is smaller than the second angle θ2, and the second angle θ2 is 80 to 100 degrees, whereby the spin torque oscillator 10 can substantially evenly oscillate at a stable oscillation frequency without the influence of the magnetic field applied to the spin torque oscillator 10 (magnetic field generation layer 14) during writing. Consequently, it is possible to increase the average in-plane magnetization value of the spin torque oscillator 10 (magnetic field generation layer 14) and thereby generate a microwave magnetic field sufficient for an assist effect. Therefore, the microwave assisted magnetic head 1 according to the present embodiment makes it possible to superimpose a microwave magnetic field of a sufficient magnetic field intensity on the recording magnetic field from the main magnetic pole layer 6 (main magnetic pole part 61) to record signals on the magnetic disc 100 having a high magnetic anisotropy energy Ku.

[Microwave Assisted Magnetic Head Production Method]

A method of producing the microwave assisted magnetic head according to the present embodiment is described. The core part of the method of producing the microwave assisted magnetic head according to the present embodiment is in a series of processes of forming the spin torque oscillator 10 after forming the main magnetic pole layer 6.

FIGS. 9A to 9D are cross-sectional views in the direction intersecting the ABS (XZ cross-sectional views) showing the steps of producing the microwave assisted magnetic head 1 according to the present embodiment.

Figure 9A:
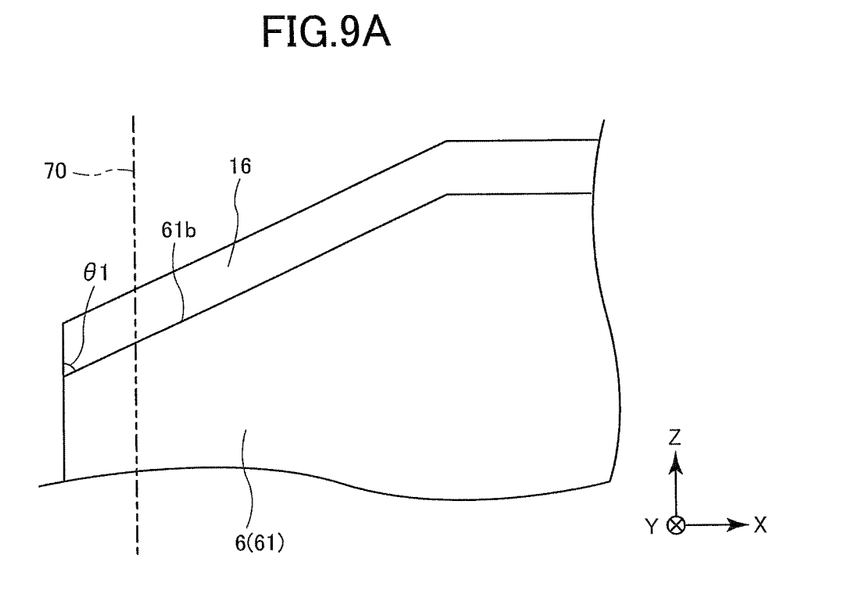
FIGS. 9A to 9D are cross-sectional views in the direction intersecting the ABS showing the production steps of the microwave assisted magnetic head according to the embodiment of the present invention.

As shown in FIG. 9A, after the main magnetic pole layer 6 is formed, a multilayer film 16 configuring the spin torque oscillator 10 (a multilayer film consisting of constituent materials of the under layer 11, the spin injection layer 12, the non-magnetic intermediate layer 13, the magnetic field generation layer 14, and the cap layer 15) is formed on the end surface 61b of the main magnetic pole part 61. The multilayer film 16 can be formed by laminating the constituent materials of the layers 11 to 15 by sputtering or the like. The first angle θ1 (see FIG. 5B) of the spin torque oscillator 10 depends on the inclination of the end surface 61b of the main magnetic pole part 61. Therefore, when the main magnetic pole layer 6 (main magnetic pole part 61) is formed, the inclination of the end surface 61b is made to be smaller than the second angle θ2 of the spin torque oscillator 10, and specifically greater than or equal to 50 degrees and less than 80 degrees.

Figure 9B:
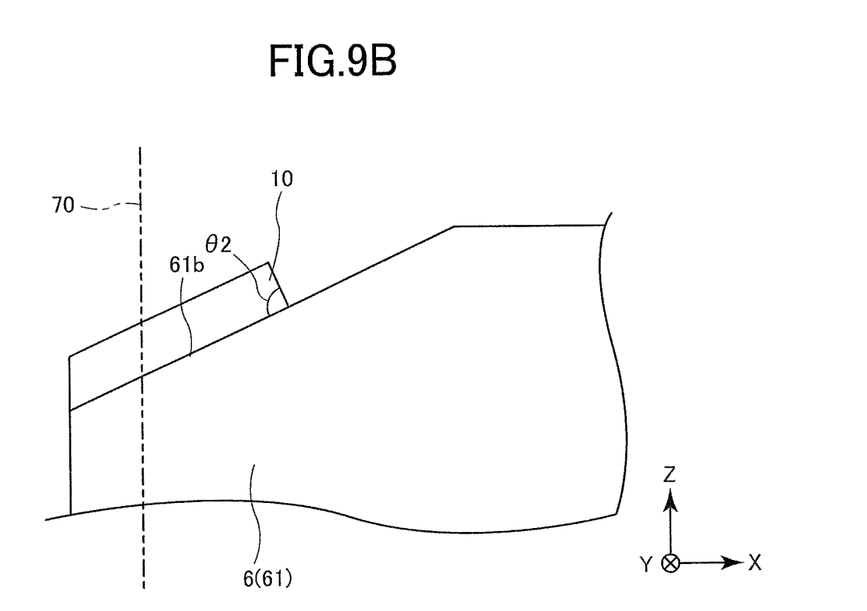

Then, as shown in FIG. 9B, the multilayer film 16 is milled to form the spin torque oscillator 10. At this time, the milling is conducted so that the second angle θ2 (see FIG. 5B) is 80 to 100 degrees. As a result, the spin torque oscillator 10 in which the first angle θ1 is smaller than the second angle θ2 and the second angle θ2 is 80 to 100 degrees is formed.

Figure 9C:
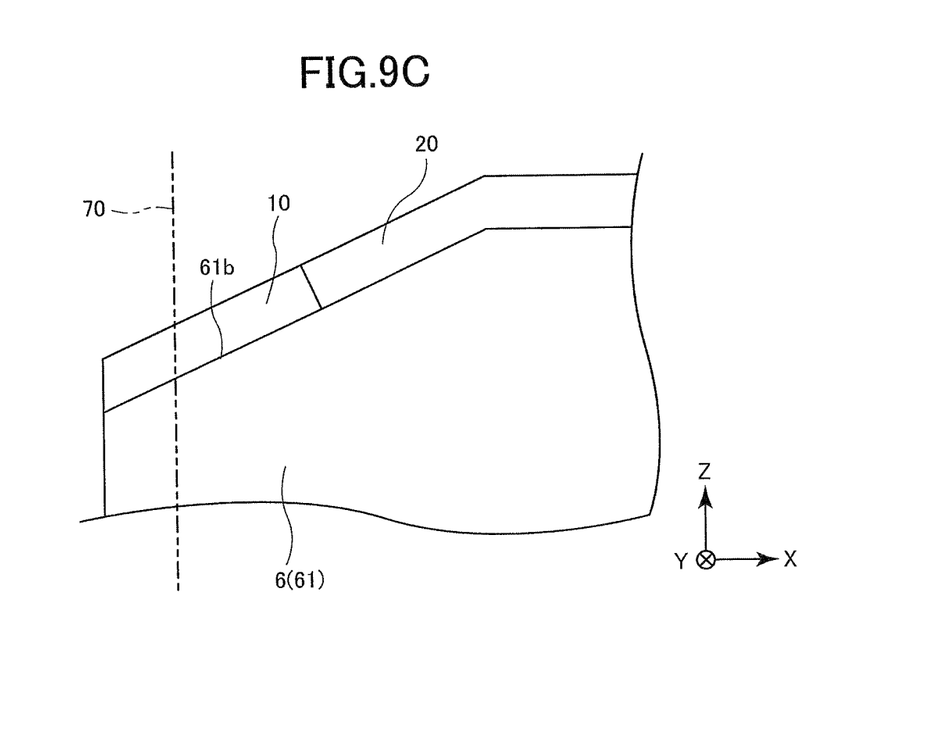

Subsequently, as shown in FIG. 9C, a sputter film 20 (write gap layer) of a non-magnetic insulating material such as $Al_2O_3$ (alumina), $SiO_2$ (silicon dioxide), AlN (aluminum nitride), or diamond like carbon (DLC) is formed on the exposed main magnetic pole layer 6 (main magnetic pole part 61).

Figure 9D:
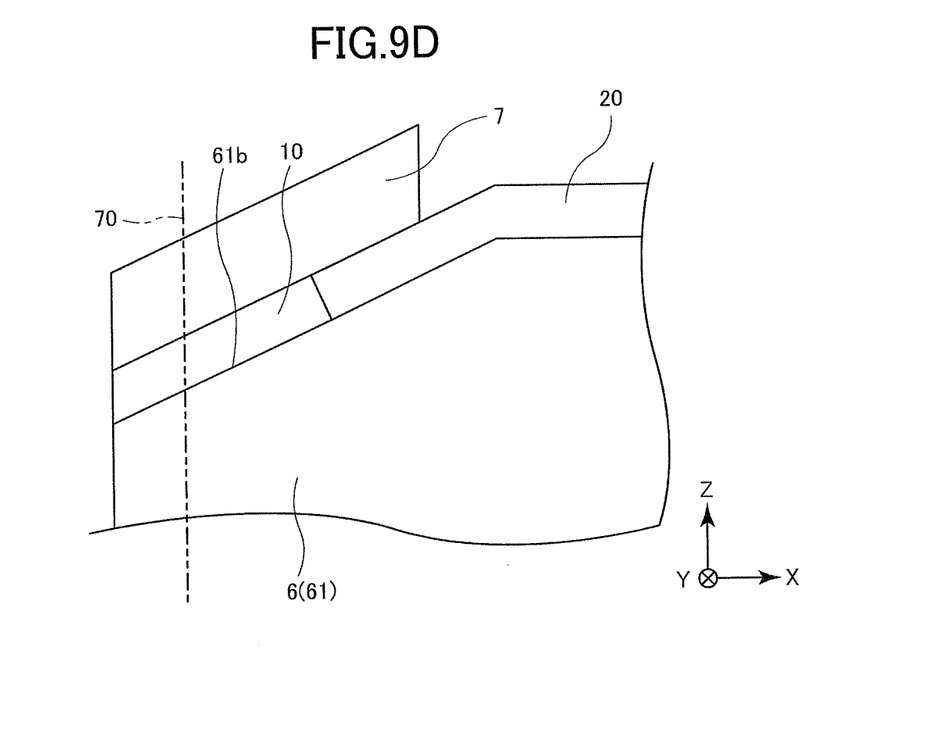

Then, as shown in FIG. 9D, the trailing shield 7 is formed on the spin torque oscillator 10 and the sputter film 20 (write gap layer). The trailing shield 7 can be formed by, for example, forming a magnetic layer consisting of a material configuring the trailing shield 7 on the integrated film including the spin torque oscillator 10 and the sputter film 20 (write gap layer) by plating or the like, creating a predetermined resist pattern by a photoresist technique, and etching the exposed magnetic layer using the resist pattern as a mask. Alternatively, the trailing shield 7 can be formed by forming a predetermined resist pattern on the integrated film including the spin torque oscillator 10 and the sputter film 20 (write gap layer) by a photoresist technique and filling the opening part of the resist pattern with a magnetic layer. As a result, the core part of the microwave assisted magnetic head 1 according to the present embodiment can be produced.

Here, it should be noted that as shown in FIGS. 9A to 9D, the head end surface on the left of the figures is polished in the X direction from the left end of the figures to a point marked as the ABS 70 so as to obtain a predetermined height after a desired head multilayer film is formed (for example, after the first coil 9a, a protective layer or non-magnetic layer, and the like are further laminated on the mode shown in FIG. 9D) whereby finally, the ABS 70 is formed.

The above-described embodiment is given for easier understanding of the present invention and not intended to restrict the present invention. Therefore, it is intended that the elements disclosed in the above-described embodiment are deemed to include any design change and equivalents falling within the technical scope of the present invention.

EXAMPLES

The present invention will be described in more detail using an experimental example. However, the present invention is not restricted to the following experimental example in any way.

Experimental Example 1

Using an analysis model of the microwave assisted magnetic head 1 having the configuration shown in FIGS. 4, 5A, and 5B, the ratio of the average in-plane magnetization value of the magnetic field generation layer 14 to the saturation magnetization of the magnetic field generation layer 14 of the spin torque oscillator 10 (the in-plane magnetization rate RM) was obtained by simulation. The simulation analysis experiment was conducted using the three dimensional finite-element-boundary-integral (FEBI) method, which is an electromagnetic field analysis.

As the microwave assisted magnetic head 1, a model in which the main magnetic pole layer 6 (main magnetic pole part 61) consisted of CoFeNi and had a saturation magnetic flux density (Bs) of 2.4 T, and the trailing shield 7 consisted of CoFeNi or a material having the same material characteristic as the main magnetic pole layer 6 (main magnetic pole part 61) was adopted. As the spin torque oscillator 10 in the model, the spin injection layer 12 was configured by [CoFe/Ni]n, and the spin injection layer 12 had a volume of 9600 $nm^3$ (40 nm×40 nm×6 nm) and a saturation magnetic flux density (Bs) of 1.1 T. Moreover, the non-magnetic spacer layer 13 was configured by Cu, and the volume of the non-magnetic spacer layer 13 was 3200 $nm^3$ (40 nm×40 nm×2 nm). Furthermore, the magnetic field generation layer 14 was configured by [FeCo/Ni]m, and the magnetic field generation layer 14 had a volume of 19200 $nm^3$ (40 nm×40 nm×12 nm) and a saturation magnetic reflux density (Bs) of 2.1 T. Then, the distance between the main magnetic pole layer 6 (main magnetic pole part 61) and the spin torque oscillator 10 was 5 nm, and the distance between the main magnetic pole layer 6 (main magnetic pole part 61) and the trailing shield 7 was 35 nm.

Figure 10:
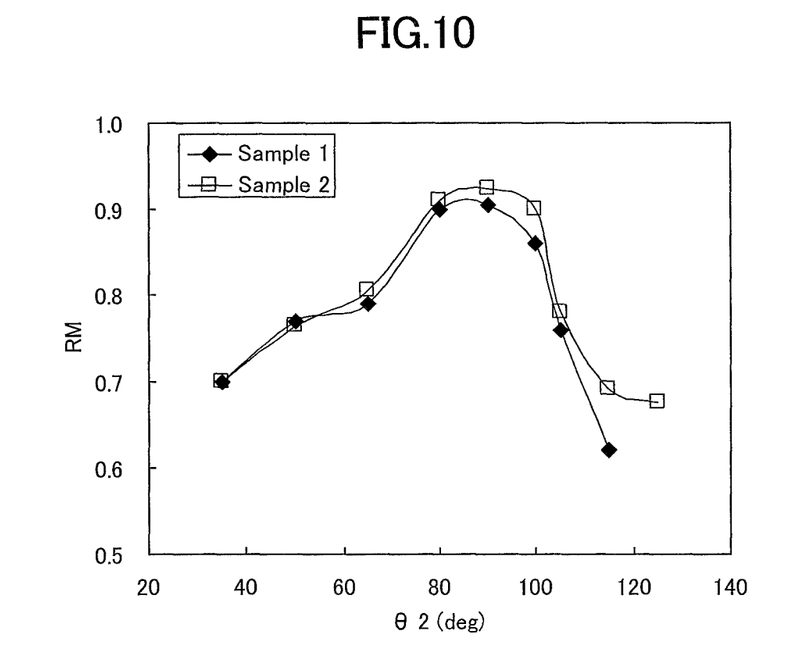
FIG. 10 is a graph showing the results of Experimental Example 1.

The graph of FIG. 10 shows the simulation results of the in-plane magnetization rate RM (Sample 1) when the first angle θ1 of the spin torque oscillator 10 was 65 degrees and the second angle θ2 was varied in a range from 35 to 115 degrees, and the in-plane magnetization rate RM (Sample 2) when the first angle θ1 was 75 degrees and the second angle θ2 was varied in a range from 35 to 125 degrees.

As shown in FIG. 10, it was confirmed that with the second angle θ2 being in a range from 80 to 100 degrees, both Sample 1 in which the first angle θ1 is 65 degrees and Sample 2 in which the first angle θ1 is 75 degrees exhibit in-plane magnetization rates RM of approximately 0.9. From those results, it was confirmed that when the first angle θ1 is smaller than the second angle θ2 and the second angle θ2 is 80 to 100 degrees, particularly 80 to 90 degrees, the spin torque oscillator 10 can substantially evenly oscillate at a stable oscillation frequency and thus generate a microwave magnetic field of a magnetic field intensity sufficient for obtaining the assist effect.

The invention claimed is:

1. A microwave assisted magnetic head, comprising:
a main magnetic pole generating a recording magnetic field applied to a magnetic recording medium from an end surface configuring a part of an air bearing surface facing the magnetic recording medium;
a trailing shield forming a magnetic guide with the main magnetic pole; and
a spin torque oscillator provided between the main magnetic pole and the trailing shield and generating a microwave magnetic field applied to the magnetic recording medium in a superimposed manner on the recording magnetic field, wherein
the spin torque oscillator has a first end surface configuring a part of the air bearing surface, a second end surface facing the main magnetic pole, and a third end surface on an opposite side of the spin torque oscillator from the first end surface,
a first angle θ1 formed by the first end surface and the second end surface is smaller than a second angle θ2 formed by the second end surface and the third end surface, and
the second angle θ2 is a non-orthogonal angle from 80 to 100 degrees.

2. The microwave assisted magnetic head according to claim 1, wherein
the second angle θ2 is 80 to less than 90 degrees.

3. The microwave assisted magnetic head according to claim 1, wherein
the first angle θ1 is greater than or equal to 50 degrees and less than 80 degrees.

4. A head gimbal assembly, comprising:
the microwave assisted magnetic head according to claim 1; and
a suspension supporting the microwave assisted magnetic head.

5. A magnetic recording device, comprising:
a magnetic recording medium;
the microwave assisted magnetic head according to claim 1; and
a positioning device supporting and positioning the microwave assisted magnetic head with respect to the magnetic recording medium.

6. The microwave assisted magnetic head according to claim 1, wherein
the spin torque oscillator contacts both the main magnetic pole and the trailing shield.

7. The microwave assisted magnetic head according to claim 1,
wherein
the spin torque oscillator is a stacked layer comprising:
an under layer,
a spin injection layer,
a non-magnetic spacer layer,
a magnetic field generation layer, and
a cap layer.

8. The microwave assisted magnetic head according to claim 7, wherein
the under layer, the spin injection layer, the non-magnetic spacer layer, the magnetic field generation layer, and the cap layer are stacked in that order.

9. The microwave assisted magnetic head according to claim 7, wherein
the under layer comprises either at least one simple metal, or an alloy of two or more metals selected from a group of: tantalum (Ta), vanadium (V), titanium (Ti), chromium (Cr), manganese (Mn), iron (Fe), cobalt (Co), nickel (Ni), and copper (Cu).

10. The microwave assisted magnetic head according to claim 7, wherein
the thickness of the under layer is between 0.8 nm and 3 nm.

11. The microwave assisted magnetic head according to claim 7, wherein
the cap layer comprises ruthenium Ru.

12. The microwave assisted magnetic head according to claim 7, wherein
the cap layer has a thickness of between 0.4 nm and 20 nm.

* * * * *